United States Patent
Kung

[11] Patent Number: 5,933,837
[45] Date of Patent: Aug. 3, 1999

[54] APPARATUS AND METHOD FOR MAINTAINING INTEGRATED DATA CONSISTENCY ACROSS MULTIPLE DATABASES

[75] Inventor: Fen-Chung Kung, Bridgewater, N.J.

[73] Assignee: AT & T Corp., New York, N.Y.

[21] Appl. No.: 08/853,579

[22] Filed: May 9, 1997

[51] Int. Cl.⁶ .................................................. G06F 17/00
[52] U.S. Cl. .......................... 707/201; 707/10; 707/101; 707/1
[58] Field of Search ........................................ 707/1–206

[56] References Cited

U.S. PATENT DOCUMENTS

| | | | |
|---|---|---|---|
| 4,714,995 | 12/1987 | Materna et al. ........................ | 707/201 |
| 5,432,931 | 7/1995 | Woess et al. ........................... | 395/650 |
| 5,452,450 | 9/1995 | Delory .................................... | 395/600 |
| 5,542,078 | 7/1996 | Martel et al. ........................... | 707/103 |
| 5,596,744 | 1/1997 | Dao et al. ................................ | 707/10 |
| 5,634,053 | 5/1997 | Noble et al. ............................. | 707/4 |
| 5,794,247 | 8/1998 | Blackman et al. ...................... | 707/103 |
| 5,794,248 | 8/1998 | Blackman et al. ...................... | 707/103 |
| 5,806,068 | 9/1998 | Shaw et al. ............................. | 707/103 |
| 5,870,746 | 2/1999 | Knutson et al. ........................ | 707/101 |

Primary Examiner—Thomas G. Black
Assistant Examiner—David Y. Jung

[57] ABSTRACT

A database network having a primary database and a plurality of heterogeneous subscribing databases for replicating data updates of the primary database in the heterogeneous subscribing databases includes a database engine connected to the primary database for capturing the data updates in the primary database, a query manager connected to the database engine for generating queries, where each of the queries is translated based on a specified format for each of the heterogeneous subscribing databases, and a data distributor connected to the query manager for distributing the translated queries to the heterogeneous subscribing databases.

14 Claims, 5 Drawing Sheets

APPARATUS AND METHOD FOR MAINTAINING INTEGRATED DATA CONSISTENCY ACROSS MULTIPLE DATABASES

BACKGROUND OF THE INVENTION

This invention relates to synchronization of various databases in a network. More particularly, the invention relates to synchronization of replicated data across heterogeneous databases in a communication network.

Many types of databases are known. There are relational model database, hierarchical model database, network model database, and many other database models. Among the available database models, the relational model is the most popular model.

In the relational database model, the database is divided into two areas—physical model and logical model where the physical model is based on each entity and the logical model is based on entity relationship. The physical and logical models are then used to generate a physical structure of a relational model database.

The hierarchical model has data structured in a parent-child relationship where the data of the child can be accessed only through the parent. Thus, in hierarchical database, the access to a child entity dependent on a parent entity can be only accessed if the key leading to the parent entity is available. In contrast, in the relational model, the data of any entity can be accessed as long as there is an appropriate key leading to such database.

For example, one way to access the relational database is a well-known definer query language called Structural Query Language ("SQL" or Sequel). But for the hierarchical database, since there is no relationship to connect the entities, it requires a very specific function call to access each entity by giving the segment key or by giving some other type of identifier to access the parent of the entity. Once the parent is accessed, the child segment can be searched or a segment number can be directly called on for locating the entity. If the entity is still in another child segment, the searching continues down to the deeper level until the entity is located.

The network model is similar to the relational model. The entities are all related where the relationship between the segments is called owner and membership. The owner owns many members and each member could be the owner of other members.

Other database models include proprietary database models and object-oriented database models. The proprietary database model can be of any construction that is suited to the use of a particular software vendor. Thus, the proprietary model may have any of combined features derived relational, hierarchical and network models or may have a totally different structure from any of the traditional database models.

Since significant amount of replicated information is resident among the network elements, operation systems, billing and support systems, it is important that the replicated copies of primary data are synchronized with the primary data. However, keeping consistent replicated information becomes more difficult where network elements can be any type of the database models discussed above such as the relational model, hierarchical model or network model.

In the telecommunication industry, a standard interface called Open Database Connectivity ("ODBC") is used for communication among different types of platforms such as IBM mainframes and Unix workstations. However, ODBC is not useful if the databases of these different platforms are different type. For example, when the primary database is relational and the subscribing databases are hierarchical, the updated data in the primary database may not be propagated because the primary database uses Structural Query Language ("SQL") while the subscribing databases do not recognize SQL.

The data inconsistency among these database models, if occurs, not only causes a significant revenue loss from a business standpoint, but also requires extremely high cost manual data synchronization. Further, the manual data synchronization involving human service may cause more data inconsistency problems.

Currently available systems for updating subscribing databases are designed for homogenous databases. The current systems also use the protocol called "two-phase commit." The two-phase commit means that the updating of subscribing databases occur only when all of the subscribing databases can be updated. Although this type of system provides that all subscribing databases at all times contain same information, the database updates may not be propagated to the databases that need the updates due to the failed acknowledgment from the databases that do not need the updates. Also, if a single subscribing database fails to acknowledge an update availability, it prevents all the rest of the subscribing databases from receiving the database updates.

It is therefore an object of this invention to provide an efficient system and method that accurately and promptly synchronizes heterogeneous databases in a network.

It is also an object of this invention to provide a system and method that correctly propagates the updates in the primary data only to subscribing databases that need the updates.

SUMMARY OF THE INVENTION

These and other objects of the invention are accomplished in accordance with the principles of the invention by providing a database network having a primary database and a plurality of heterogeneous subscribing databases for replicating data updates of the primary database in the heterogeneous subscribing databases. The database network includes a primary database engine connected to the primary database for capturing the data updates in the primary database. A query manager connected to the database engine for generating queries translates queries based on a specified format for each of the heterogeneous subscribing databases. A data distributor connected to the query manager distributes the translated queries to the heterogeneous subscribing databases.

The database network may further include a subscription controller for verifying that at least one of said subscribing databases needs the updates made in the primary database so that the query manager generates queries only for the subscribing databases that need the updates.

The database network may also include a synchronization manager for controlling sequences of the queue distribution where each queue is categorized as immediate or deferred queue based on query's time sensitivity. The queue may be categorized as a retry queue if the previous transmission has failed.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
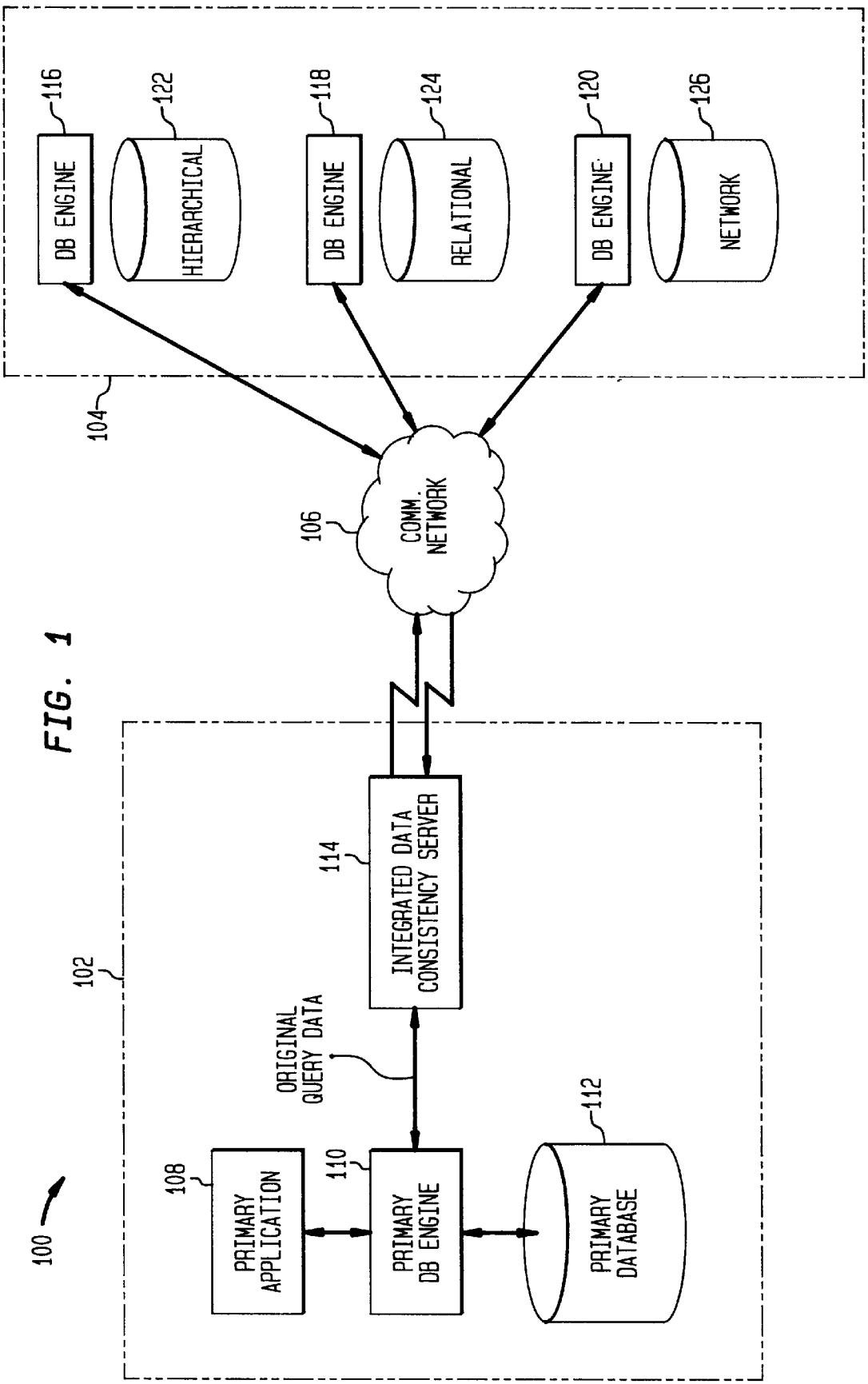
FIG. 1 is a simplified block diagram of illustrative network which can be operated in accordance with this invention.

In the illustrative embodiment shown in FIG. 1, database network 100 of the present invention includes primary system 102 connected to subscribing systems 104 via communication network 106.

Primary system 102 contains primary application 108, primary database engine 110, primary database 112 and integrated data consistency server 114. Primary database engine 110 detects the transactions in primary application 108 that causes updates in primary database 112 and captures the updates to forward to integrated consistency server 114. Upon the receipt of the updates, integrated consistency server 114 runs the steps illustrated in FIGS. 3 and 4, while the update database transactions are performed at primary database 112.

Communication network 106 delivers the processed results from integrated data consistency server 114 to proper database engines 116, 118 and 120 of subscribing systems 104. For example, subscribing systems 104 include database engines 116, 118 and 120 attached to hierarchical database 122, relational database 124 and network database 126. Many other types of databases can be added to subscribing systems 104. Database engine 116, 118 and 120 each receives appropriately formatted database updates and updates hierarchical database 122, relational database 124 and network database 126 respectively.

Figure 2:
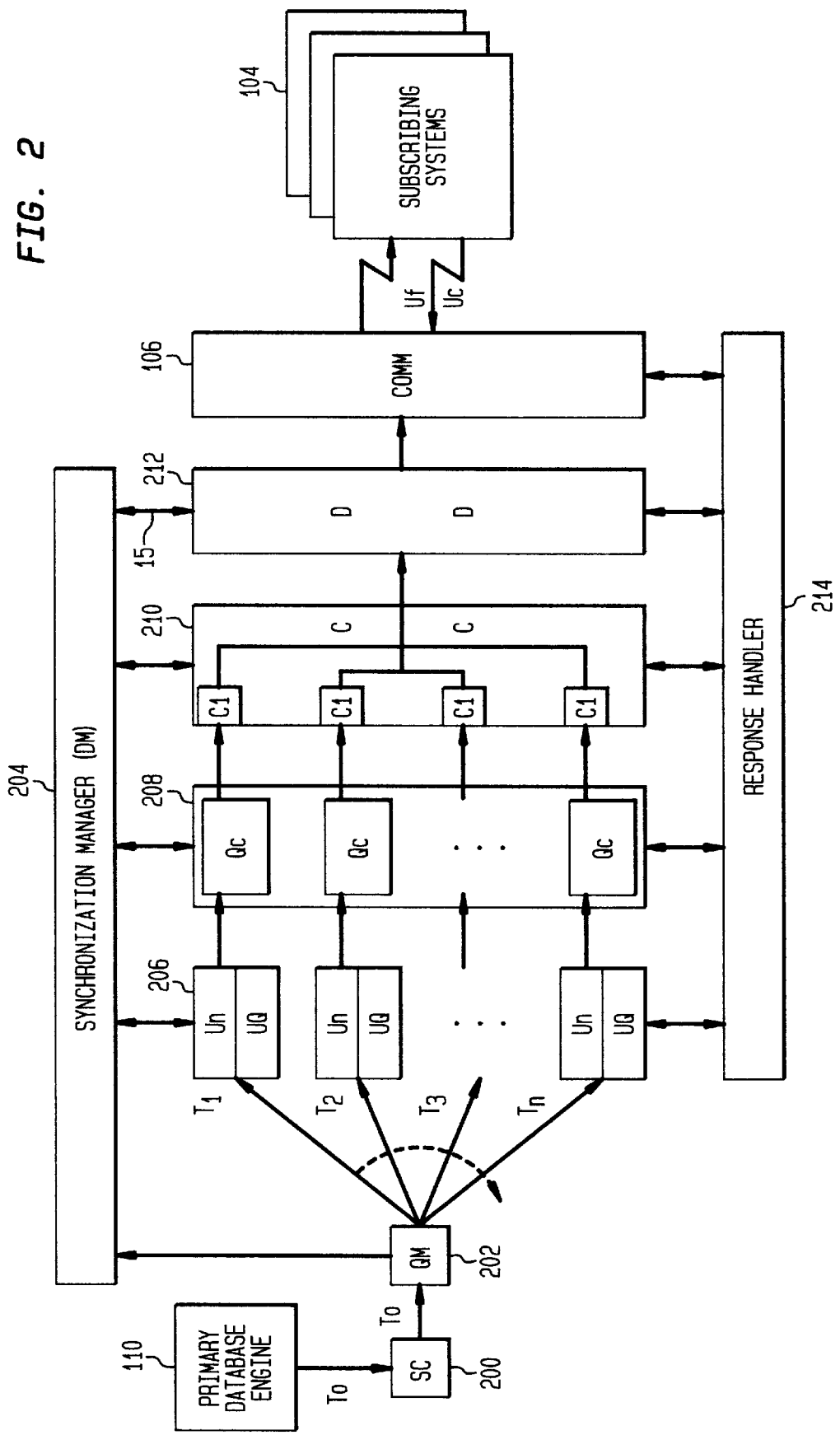
FIG. 2 is a more detailed block diagram of illustrative integrated data consistency server of the network of FIG. 1.

FIG. 2 shows integrated data consistency server 114 (FIG. 1) connected to primary database engine 110 (FIG. 1) and communication network 106 (FIG. 1) in more details. Integrated data consistency server 114 includes subscription controller ("SC") 200, query manager ("QM") 204, update queues ("Un") 206, queue controllers ("Qc") 208, concurrence controller ("CC") 210, data distributor ("DD") 212 and response handler ("RH") 214.

Subscription controller 200 is connected to database engine 110 and receives the data updates captured or recorded by primary database engine 110. Based on the captured data updates, subscription controller 200 determines whether the data updates need to be propagated at all. The data updates need to be propagated if any of databases 122, 124 and 126 needs the data updates for its application.

Based on the findings of subscription controller 200, query manager 204 connected to subscription controller 200 generates queries only for the databases that need the updates. Query manager 200 then determines which of subscribing databases requires translations and subsequently translates the queries into appropriate formats based on the types of subscribing database models. Query manager 202 is connected to synchronization manager 204 so that when a query is generated, a notice alerts synchronization manager 204.

Update queues 206 connected to both query manager 204 and synchronization manager 204 store the queries generated from query manager 204. Each queue also contains the number of update transactions ("Un") which indicate the total update transactions stored in each update queue.

Each of queue controller 208 is connected to each of corresponding update queues 206 and synchronization manager 204. Thus, the number of queuing controllers indicate the number of present queues waiting for transmission to subscribing system 104.

Concurrence controller 210 connected to queue controller 208 and synchronization manager 204 controls the openings of the distribution channel of data distributor 212 and contains the control level ("Cl") information which indicate the number of available distribution channels.

Data distributor 212 is connected to both concurrent controller 210 and synchronization manager 204 distributes updates in queues to subscribing systems 104.

Communication network 106 connects data distributor 212 and subscribing systems 104. Communication network 106 may contain various types of communication means such as underground telecommunication links, wireless links and satellite links. Communication network 106 may also contain subnetwork such as computer network or cable television network.

Figure 3:
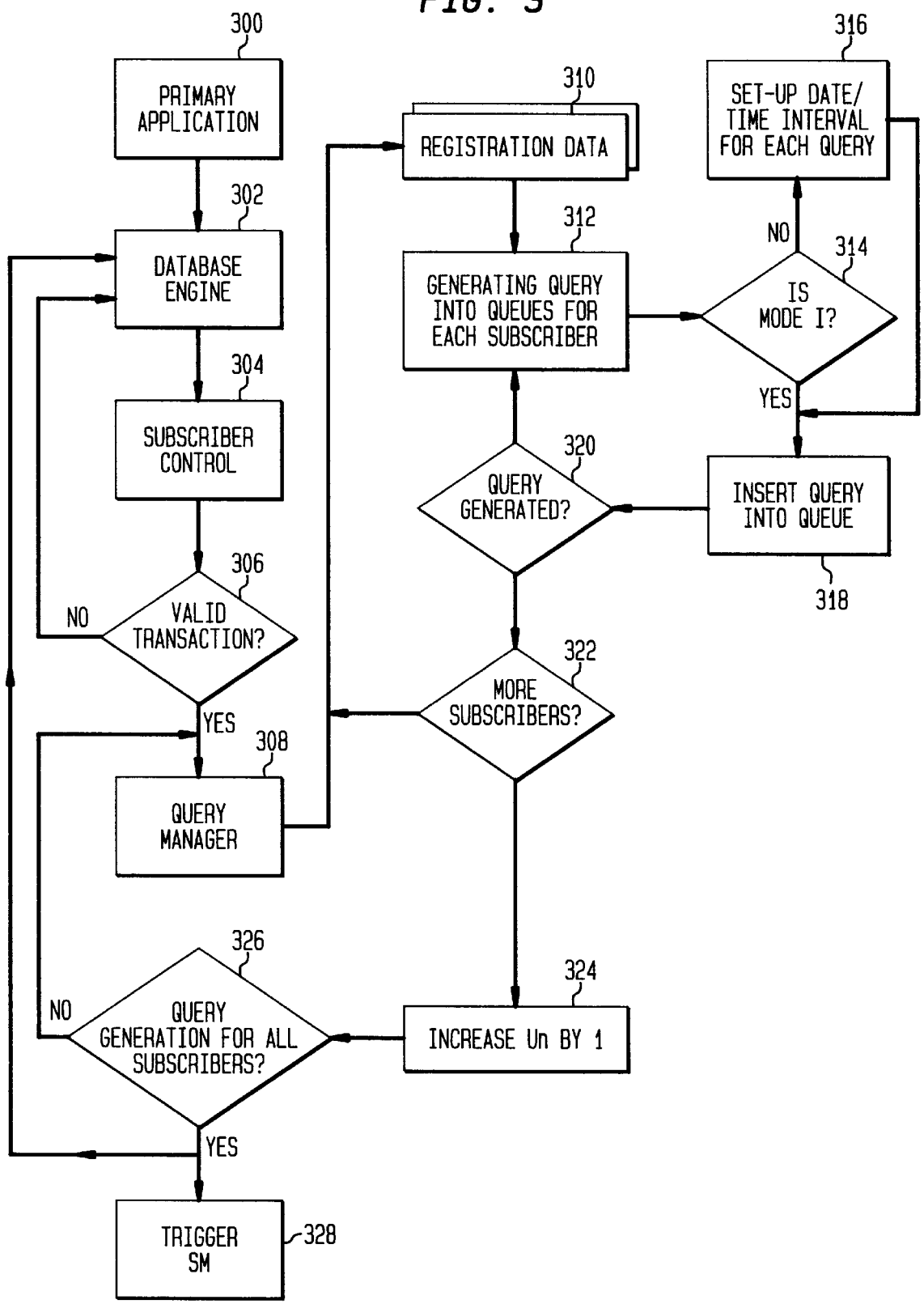
FIGS. 3–5 are a flow chart of steps for carrying out an illustrative embodiment of the method of this invention.
Figure 4:
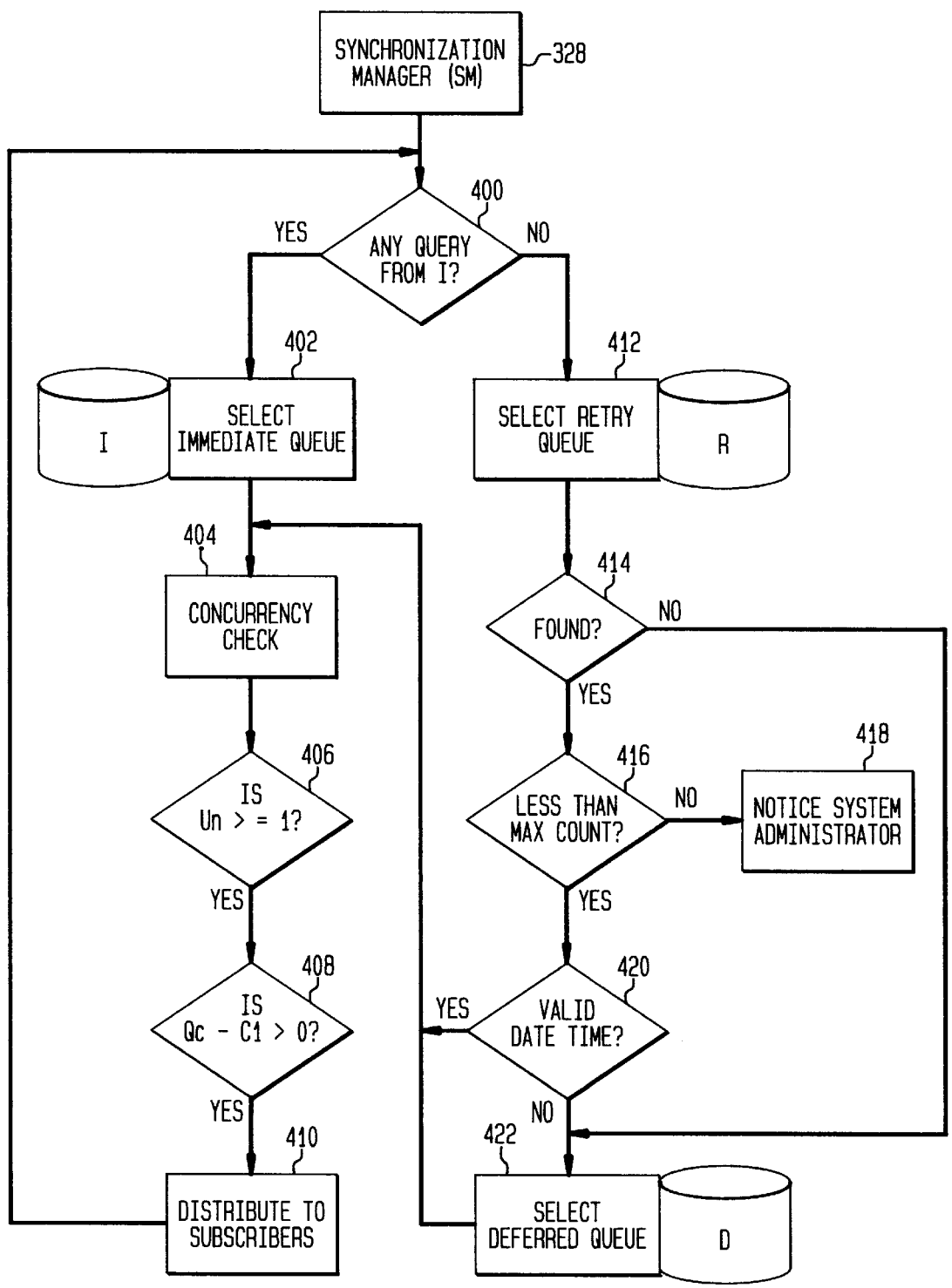

The functions of subscription controller 200, query manager 204, update queue 206, queue controller 208, concurrence controller 210, data distributor 212 and response handler 214 are also illustrated with respect to steps in FIGS. 3 and 4.

FIG. 3 shows an illustrative sequence of steps in accordance with this invention for updating the subscribing systems 104 (FIG. 1) with the data updates made in primary system 102 (FIG. 1). However, the order of the steps is not critical and can be arranged in various other ways without compromising the operation of the heterogeneous database network 100 (FIG. 1) of present invention.

In step 300, primary application 108 (FIG. 1) processes transactions that require database updates in primary database 112 (FIG. 1).

In step 302, primary database engine 110 (FIG. 1) detects the database update transactions and captures the data updates to be made in primary database 112 (FIG. 1).

In step 304, primary database engine 110 passes the captured data updates to subscriber controller 200 (FIG. 2) while primary database 112 (FIG. 1) is updated.

In step 306, subscriber controller 200 (FIG. 2) determines subscription of subscribing systems 104 (FIG. 1), i.e. whether any database in subscription systems 104 (FIG. 1) is affected by the update transactions. Subscriber controller 200 (FIG. 2) thus determines if any of subscribing databases 122, 124 and 126 needs the updates that are made in primary database 112 (FIG. 1).

If none of subscribing databases 122, 124 and 126 (FIG. 1) needs the updates, integrated data consistency server 114 (FIG. 1) becomes idle and returns to step 302 to wait for the detection of database engine 110 (FIG. 1) for next update transaction in primary system 102 (FIG. 1).

If any subscribing databases 122, 124 and 126 (FIG. 1) needs the updates of primary database 112 (FIG. 1), then query manager 202 (FIG. 2) in step 308 receives the updates.

In step 310, query manager 202 (FIG. 2) retrieves registration data from primary database 112 (FIG. 1) or, alternatively, a separate database (not shown) containing registration data. The registration data contains information about databases 122, 124 and 126 (FIG. 1) of subscription system 104 (FIG. 1). The registration data also contains predetermined or sample query descriptions that can be used by query manager to construct queries appropriate for each of subscribing databases 122, 124 and 126 (FIG. 1).

In step 312, query manager 202 (FIG. 2) generates a database query for each of databases 122, 124 and 126 (FIG. 2) in subscription system 104 (FIG. 1) based on the retrieved registration data. The database queries, for example, is constructed in the standard Structured Query Language ("SQL") designed for relational database.

Using the subscriber database information, query manager 202 (FIG. 2) performs query translations of a general query received from primary database engine 110 (FIG. 1) to a query that is recognizable by subscribing databases 122, 124 and 126 (FIG. 1). The format for translations is defined by subscriber engines 116, 118 and 120 (FIG. 1).

Synchronization manager 204 (FIG. 2) in step 314 determines whether the query has an immediate mode i.e. requiring immediate attention so that the query is distributed to subscribing systems 104 (FIG. 1) promptly.

If not, the synchronization manager 204 (FIG. 2) sets up a date and time interval for each query so that queue containing such query can be distributed at the prespecified date and time.

In step 318, synchronization manager 204 (FIG. 2) in step 318 stores the translated queries in update queues 206 (FIG. 2) where the query with the immediate mode is placed into an immediate queue and the query with specified date and time is placed into a deferred queue.

Update queues 206 (FIG. 2) thus fall into any of three following categories: immediate queue ("I"), deferred queue ("D") and retry queue ("R"). The retry queue is set when the acknowledgment from subscribing systems (FIG. 1) indicatesfailure in the transmission process and described in more details with respect to FIG. 5.

In step 320, synchronization manager 204 (FIG. 2) confirms that query has been generated into queues.

If not, the synchronization manager 204 (FIG. 2) returns to step 312 to place the query into a queue.

If confirmed, synchronization manager 204 (FIG. 2) determines whether there is any more subscribing system 104 that needs the query containing the updates in primary system 110 (FIG. 1).

If there is a subscribing system 104 (FIG. 1) that needs the update query, then synchronization manager 204 (FIG. 2) returns to step 310 to generate query for the additional subscribing system(FIG. 1) based on the registration data specific to the additional subscribing system 104 (FIG. 1).

If there no subscribing system 104 (FIG. 1) requiring the updates, synchronization manager (FIG. 2) in step 324 increases the number of update transactions ("Un") by one.

In step 326, synchronization manager 104 (FIG. 2) determines that all of the subscribing systems 104 (FIG. 1) that need updates already have translated queries in queues waiting to be transmitted to the subscribing systems 104 (FIG. 1).

If not, the synchronization manager 104 (FIG. 2) returns to step 308 so that query manager 202 (FIG. 2) review the updates that were received from primary system 102 (FIG. 2).

If all queues necessary for updating the subscribing systems 104 (FIG. 1) are generated, synchronization manager 104 (FIG. 2) in step 328 is triggered to proceed with distribution as described in greater detail with respect to FIG. 4.

Referring to FIG. 4, synchronization manager 204 (FIG. 2), in step 400, constantly checks the status of the queries in queues 206 (FIG. 2) that need to be transmitted. Synchronization manager 204 (FIG. 2) checks the queue status by first determining in step 401 whether there is any queue in queue controller 208 (FIG. 2) having the immediate mode.

If there is any queue having the immediate mode, synchronization manager 204 (FIG. 2) in step 402 selects all the queues with the immediate mode and groups them for transmission to subscribing systems 104 (FIG. 1).

For each of databases 112, 124 and 126 (FIG. 1), synchronization manager 204 (FIG. 2) in step 404 processes concurrence check by first determining in step 406 whether the number of update transactions, Un, is greater than or equal to one, i.e., whether there is at least one updates in the queue.

If there is at least one update transaction in the queue, synchronization manager 204 (FIG. 2) in step 408 determines if the number of queries subtracted by the concurrence level is greater than 0. Synchronization manager 204 (FIG. 2) thus checks whether concurrence controller 210 (FIG. 2) can handle the number of queries handled by query manager 202.

If it is found that concurrence controller 210 (FIG. 2) can handle the number of queries handled by query manager 202, synchronization manager 204 (FIG. 2) in step 410 enables concurrence controller 210 (FIG. 2) to open the distribution channels for queues and data distributor 212 (FIG. 2) distributes update transaction formatted for each of database engines 116, 118 and 120 (FIG. 1) of subscribing system 104 (FIG. 1) via communication network 106 (FIG. 1).

Synchronization manager 204 (FIG. 2) returns to step 400 to determine whether all the queues with the immediate mode have been processed.

If there is no more immediate queue, synchronization manager 204 (FIG. 2) in step 412 selects and groups all the retry queues in the update queues 206 (FIG. 2).

Synchronization manager 204 (FIG. 2) in step 414 determines if any retry queue is found from step 412. If not, synchronization manager 204 (FIG. 2) proceeds to step 422 to process the rest of the queues which would be deferred queues at this point.

If any retry queue is found, synchronization manager 204 (FIG. 2) in step 416 examines the retry queue by verifying that the retry count does not exceed the predetermined maximum count number.

If the retry count exceeds the predetermined maximum number of requeries, synchronization manager 204 (FIG. 2) prompts in step 418 a notice to a system administrator reporting that the retry count exceeds the maximum number. This step ensures that the transmission resources and queuing resources are not wasted on queues that are directed to missing or defective subscribing systems.

If the retry count does not exceed the maximum number of queries, synchronization manager 204 (FIG. 2) determines if the date and time attached to the queue falls is valid, i.e. the date and time falls within the specific interval allocated for the data distribution.

If the date and time falls within the specific interval allocated for the data distribution, synchronization manager 204 (FIG. 2) proceeds to step 404 for concurrence check and subsequent distribution.

If the data and time does not fall within the specific interval allocated for data transmission, synchronization manager 204 (FIG. 2) proceeds to step 422 to select and group deferred queues. Thereafter synchronization manager 204 proceeds to step 404 for concurrence check and subsequent distribution.

Figure 5:
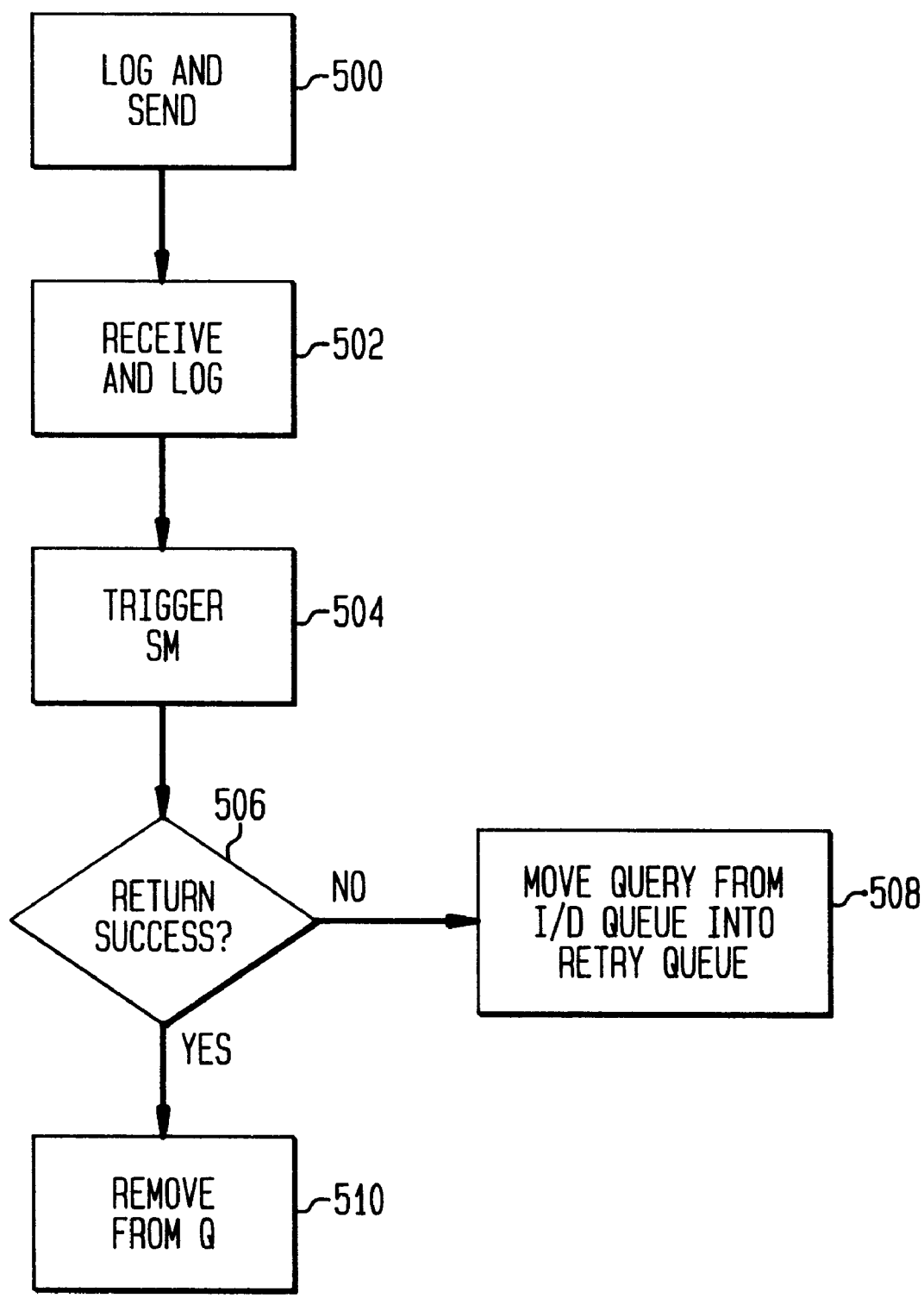

FIG. 5 illustrates the distribution process to subscribing systems 104 (FIG. 1) that was discussed in relationship to step 410 in more details.

In step 500, as data distributor 212 (FIG. 2) transmits the update transaction query, the status of the sending query is logged for records with date and time. The update query that is sent to subscribing systems 104 (FIG. 1) requires acknowledgment and prompts database engine 116, 118 or 120 (FIG 1) to return the acknowledgment. The acknowledgment indicates whether the subscribing systems have received the transmitted query with the following symbols: query update completed ("Uc") or query update failed ("Uf").

In step 502, response handler 214 (FIG. 2) receives the acknowledgment from database engine 116, 118 or 120, and logs the acknowledgment.

In step 504, response handler 214 (FIG. 2) triggers synchronization manager 204 (FIG. 2) to maintain current information with the acknowledgment.

Synchronization manager 204 (FIG. 2) in step 506 determines whether the acknowledgment for each query indicates query transmission was successful and completed.

If acknowledgment indicates that query transmission is a failure, synchronization manager 204 (FIG. 2) in step 508 moves the queue so that such retry queue will be picked up for transmission again in step 326 (FIG. 3).

If synchronization manager 204 (FIG. 2) receives the acknowledgment indicating successful transmission, synchronization manager 204 (FIG. 2) in step 510 removes the queue from update queue 206 (FIG. 2), and decreases the concurrence control level in concurrence controller 210 (FIG. 2) by one.

It will be understood that the foregoing is only illustrative of the principles of the invention and that various modifications can be made by those skilled in the art without departing from the scope and spirit of the invention.

I claim:

1. A database network having a primary database having a first format and a plurality of heterogenous subscribing databases, said heterogenous subscribing databases having formats different from said primary database, said heterogenous subscribing databases for replicating data updates of said primary database, said database network comprising:

a database engine coupled to said primary database for capturing said data updates with said first format in said primary database;

a query manager coupled to said database engine for generating at least one database update query using said data updates, said database update query being translated from said first format into a format for a corresponding heterogenous subscribing data base and forming a translated database update query based on a format for said heterogenous subscribing database and a data distributor coupled to said query manager for distributing said translated database update query to the corresponding heterogenous subscribing database.

2. The database network in claim 1, further comprising:

a subscription controller for verifying that at least one of said heterogenous subscribing databases needs said data updates; and said query manager for generating database update queries only for said at least one of said heterogenous subscribing databases that needs said updates.

3. The database network in claim, further comprising a synchronization manager coupled to said query manager for controlling said database update query distribution.

4. The database network in claim 3, further comprising a plurality of update queues coupled to said query manager for storing said database update queries generated from said query manager.

5. The database network in claim 4, further comprising a queue controller coupled to said update queues for prioritizing said queues in distribution.

6. The database network in claim 5, further comprising:

a concurrence controller connected to said queue controller for opening distribution channels of said distributor; and said synchronization manager enables said concurrence controller only if said queues can be handled by said concurrence controller.

7. The database network in claim 3, further comprising:

a response handler for verifying completion of said updates in said subscribing databases; and said synchronization manager for redistributing said queries if said updates in said subscribing databases fail.

8. A method of replicating data updates of a primary database in a plurality of heterogenous subscribing databases in a database network having said primary database and said heterogenous subscribing databases, comprising:

capturing said data updates in said primary database;

generating database update queries from said data updates in said primary database, each of said database update queries being translated into a format compatible with said heterogenous subscribing databases based on a specified format for each of said heterogenous subscribing databases; and distributing said translated database update queries to said heterogenous subscribing databases.

9. The method in claim 8, further comprising the step of:

verifying that at least one of said heterogenous subscribing databases needs said updates; and generating database update queries only for at least one of said subscribing heterogenous databases that need said update.

10. The method in claim 8, further comprising the step of controlling said query distribution.

11. The method in claim 10, further comprising the step of storing said database update queries generated from said query manager.

12. The method in claim 11, further comprising the step of prioritizing said queues in distribution.

13. The method in claim 12, further comprising the steps of:

opening distribution channels of said distributor; and enabling said distribution channels only if said queues can be handled by said distribution channels.

14. The method in claim 10, further comprising the steps of:

verifying completion of said updates in said subscribing databases; and redistributing said queries if said updates in said subscribing databases fail.

* * * * *

UNITED STATES PATENT AND TRADEMARK OFFICE
CERTIFICATE OF CORRECTION

PATENT NO. : 5,933,837  
DATED : August 3, 1999  
INVENTOR(S) : Fen-Chung Kung

Page 1 of 1

It is certified that error appears in the above-identified patent and that said Letters Patent is hereby corrected as shown below:

Column 3,
Lines 42, 54, 63 and 65, "204" has been replaced with -- 202 --,
Line 43, "("UN")" has been replaced with -- ("UQ") --,
Line 56, "200" has been replaced with -- 202 --, Column 4,
Line 12, "concurrent" has been replaced with -- concurrence --,
Line 23, "204" has been replaced with -- 202 --, Column 5,
Line 34, -- a -- has been inserted before the word "query" and -- the -- has been inserted before the word "queues", Column 7, claim 1,
Line 53, "data base" has been replaced with -- database --,
Line 55, -- ; -- has been inserted after the word "database".

Signed and Sealed this

Second Day of April, 2002

Attest:

JAMES E. ROGAN
Attesting Officer                Director of the United States Patent and Trademark Office